United States Patent

Castrucci et al.

[15] 3,641,516

[45] Feb. 8, 1972

[54] WRITE ONCE READ ONLY STORE SEMICONDUCTOR MEMORY

[72] Inventors: Paul P. Castrucci, Poughkeepsie; Harlan R. Gates, Wappingers Falls; Robert A. Henle, Hyde Park; Wilbur David Pricer, Poughkeepsie; Robert M. Morton, Hopewell Junction; John W. Mason; William D. North, both of Poughkeepsie, all of N.Y.

[73] Assignee: International Business Machines Corporation, Armonk, N.Y.

[22] Filed: Sept. 15, 1969

[21] Appl. No.: 858,053

[52] U.S. Cl. ....................340/173 SP, 317/235 D, 317/235 J

[51] Int. Cl. ....................G11c 11/36, G11c 17/00

[58] Field of Search ....................340/173; 317/235

[56] References Cited

UNITED STATES PATENTS

| | | | |
|---|---|---|---|
| 3,245,051 | 4/1966 | Robb | 340/173 |
| 3,411,052 | 11/1968 | Lauffer et al. | 317/235 |
| 3,412,220 | 11/1968 | Puppolo et al. | 340/173 X |
| 3,414,782 | 12/1968 | Lin et al. | 317/235 |
| 3,488,636 | 1/1970 | Dyck | 340/173 |
| 3,500,148 | 3/1970 | Gunther et al. | 317/235 X |

*Primary Examiner*—Stanley M. Urynowicz, Jr.
*Attorney*—Sughrue, Rothwell, Mion, Zinn and Macpeak

[57] ABSTRACT

A read only memory having the capability of being written into once after manufacture. The cells of the memory are capable of being fused or permanently altered by directing a fusing current to the selected cells. The cell is a monolithic semiconductor device comprising a diode to be biased in a forward direction and a diode to be biased in the reverse direction structured so as to form back-to-back diodes. The reverse diode has a lower reverse breakdown voltage than the forward diode, and a metal connection, unconnected to any remaining circuit elements contacts the semiconductor device between diode junctions. The fusing current causes a metal-semiconductor alloy to form and short out the reverse diode.

12 Claims, 9 Drawing Figures

INVENTORS
PAUL P. CASTRUCCI
HARLAN R. GATES
ROBERT A. HENLE
JOHN W. MASON
ROBERT M. MORTON
WILLIAM D. NORTH
WILBUR DAVID PRICER

BY Sughrue, Rothwell, Mion, Zinn & Macpeak
ATTORNEYS

WRITE ONCE READ ONLY STORE SEMICONDUCTOR MEMORY

BACKGROUND

Matrix arrays are known in the art for providing logic and storage capabilities. A matrix array usually includes a first plurality of electrical conductors, a second plurality of electrical conductors and elements or cells which provide interconnection between the first and second groups of conductors. As an example a plurality of horizontal and vertical lines could be connected at selected cross-points by cells such as diodes or capacitors to provide electrical connection between the horizontal and vertical conductor forming the cross-points.

One use of such a matrix in the computer industry is as a read only store (ROS), i.e., a memory which can read from but not written into. In the matrix type of ROS memories, each cross-point may be thought of as a bit location, with a cell connection at the cross-point representing one condition, such as a binary one, and the absence of a connection at the cross-point representing an opposite condition, such as a binary zero. A word, comprised of a plurality of binary bits, could be read out by applying a current or voltage on one of the first group of conductors and detecting the response voltages or currents on all or a portion of the other group of conductors which "cross" the first group of conductors. The detected quantity will differ for those lines which are connected by cells to the energized line and those lines which are not so connected.

As pointed out above, examples of cells are capacitors and diodes. The difficulty with such a matrix is that the matrix manufacturer has to make a different matrix for every customer whose information requirements are different. For example, two users of ROS matrices most likely would need to store different information in their respective ROS memories. Since the cell interconnections determine the data content of the ROS memory a different device would have to be manufactured for each customer.

A preferred situation is to have a ROS memory in which the choice of connection at the cross-points can be made after manufacture. Such a memory is effectively a "write once read only store." Such devices have been proposed in the prior art. One such prior art device contemplates placing a diode in series with a fuse at every cross-point. The matrix is programmable or alterable by selectively burning out the fuse where a "no-connection" cross-point is desired.

In solid state technology the fuses in the fuse-diode combination were thin aluminum strips and required heavy current to burn them out. The large burn out currents makes the fuse device unsatisfactory for large scale integrated circuit memories. A large scale integrated circuit memory having a great number of bit locations includes a decoding circuit as part of the integrated structure for addressing the word and bit lines. The integrated diode circuits cannot handle the large currents required to burn out a fuse.

Another proposal has been to use oppositely poled PN-junctions, otherwise known as back to back diodes, as the cells of a programmable matrix; the proposal suggesting that a given cell can be altered by burning out the junction of the reverse biased diode. A cell with the burned out diode provides an electrically conductive path at the cross-point in contrast with the nonconductive barrier formed by back to back diodes. For reasons described hereinafter, and discovered by applicants, the last mentioned approach has been found to be unsatisfactory and unworkable for large scale integrated circuit memories.

SUMMARY OF THE PRESENT INVENTION

In accordance with the present invention there is provided a monolithic write once read only store memory having cells which are predictably alterable. Further, in accordance with the present invention there is provided an alterable cell for use in a matrix, which cell is easily alterable by relatively low level current and voltages. The cell is comprised of a pair of monolithically formed back to back diodes having unequal breakdown voltages with a metal contact directly connected to the region of semiconductor forming the common part of said back to back monolithic diodes.

It has been discovered by applicants that the prior art proposed back to back diode cell is not satisfactory for use as a write once read only store memory.

First, a complete destruction of the PN barrier by the thermal breakdown process contemplated in the prior art requires relatively large amounts of power to be applied to the cell. The large "burn out" current requirements severely limit the bit density of the chip. For example, assuming a reasonable density of 512 bits of storage (about 2,000 components) on a 120 mil by 120 mil chip, the largest current which could be handled is about 200 ma. This is insufficient for destruction of the PN junction in the prior art back-to-back diode proposal, but is more than sufficient to create a metal-semiconductor alloy short across the junction in accordance with the present invention.

Secondly, the burn out of a selected cell in the matrix could be prevented by sneak paths created in part by previously burned out cells and providing an alternate electrical path between the selected horizontal and vertical lines. The sneak path problem is overcome by making the diodes of the diode pair so that the diode to be burned out has a lower breakdown voltage than that of the diode not to be burned out.

DETAILED DESCRIPTION OF THE DRAWINGS

Figure 1:
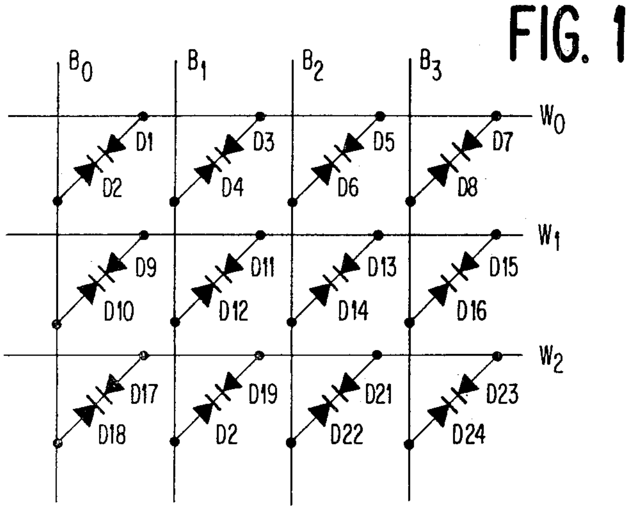
FIG. 1 is a schematic diagram of a diode matrix.

A 12 cell or 12 bit back-to-back diode matrix is illustrated in FIG. 1 for the purpose of illustrating the relationship of a cell to an ROS memory. The matrix comprises four bit lines $B_0$–$B_3$ three word lines $W_0$–$W_2$, and 12 cells, each connected between one bit line and one word line. The cells are identified herein by the lines they are connected to, e.g., the cell containing diodes $D_1$ and $D_2$ is identified as cell $B_0W_0$ or cell 00.

The back-to-back diodes prevent conduction between the word and bit lines provided the applied voltage is below the reverse breakdown voltage of the reverse biased diodes. It has been discovered by applicants that the reverse-biased diode can be shorted by applying a relatively low level current thereto. The phenomenon, called fusing, can be selectively applied to the cells by applying a fusing voltage or current between or to one-word line and one-bit line. Assuming cell 21 is selected for fusing and the polarity of the applied signal is such that diode D14 is reverse biased, diode D14 will fuse and thus a highly conductive path will be provided between W1 and B2 in the forward direction of nonfused diode D13.

The cell 21 can now be said to represent one state which is opposite to the state it previously occupied. The two states can be detected in a conventional matrix application by applying a voltage or current to one line connected to the cell and sensing the change in current or voltage in the other line connected to the cell. A matrix of the type described thus has the capability of acting as write once read only store.

Figure 2:
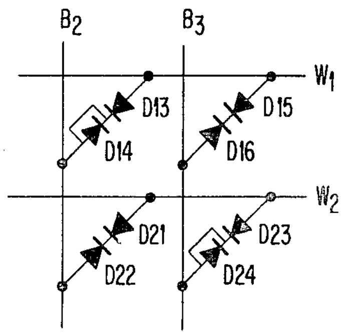
FIG. 2 is a schematic diagram of a portion of the matrix of FIG. 1 and illustrates a problem which is overcome by the present invention.

As indicated above, one of the problems with the prior art proposal of using back to back diodes in a matrix was that sneak paths, discovered by applicants, may prevent the selected diode from being destroyed and may cause one of the forward diodes in a nonselected cell to be destroyed, or fused. This problem is illustrated in FIG. 2 which shows a partial matrix having four cells 21, 31, 22 and 32. It is assumed the polarity of the applied currents and voltages are such that the even numbered diodes are the reverse biased diodes and the odd numbered diodes are the forward biased diodes. The shorts across diodes D14 in cell 21 and D24 in cell 32 indicate that cells 21 and 32 have already been "written" into. Assume it is now desired to write into cell 31. As described above this is accomplished by applying the proper electrical quantity between lines $W_1$ and $B_3$ to fuse reverse diode D16. It can be seen that an alternate path between $W_1$ and $B_3$ is: diode D13, line B2, diode D22, diode D21, line $W_2$ and diode D23. Consequently, the reverse bias voltage applied to diode D21 is the same as that applied to the target diode D16 except for the small forward voltage drops of diodes D13 and D23. Consequently, the diode D21 may be permanently altered even though this is undesirable.

The sneak path problem is overcome in accordance with the present invention by making the diodes in the cell so that the diodes to be fused have lower breakdown voltages than those which are not to be fused. For example a 7-volt breakdown voltage for the even numbered diodes of FIG. 2 and a 20-volt breakdown voltage for the odd numbered diodes of FIG. 2 would insure that in the above described situation, diode D16 alone would be fused.

The other major problem with the prior back-to-back diode matrix proposal, as discussed briefly above, is the large amounts of power required to destroy the PN junction which is the reverse biased diode. Applicants have found that relatively low level power can short a planar PN junction. It has been discovered by applicants that when sufficient power, by current or voltage application, is applied to the diode for a sufficient period of time, a metal-semiconductor alloy forms substantially at the surface of the semiconductor material, but below the typical oxide covering layer, and connects the metal lands on both sides of the junction thereby shorting the junction. Currents substantially below 200 ma. have been used to "fuse" diodes in this manner at times in the millisecond range. This has been done by forcing a current through the reverse diode via a current generator and allowing the voltage to be assumed by the diode. The voltage will go from the breakdown voltage of approximately 7 or 8 volts down to less than 1 volt in a matter of milliseconds. Visual inspection of photomicrographs of a fused junction show a metallic looking connecting extending between the metal lands.

It is believed that the current applied to the diode heats the diode in the area of the junction to the eutectic temperature of the metal-semiconductor causing atomic alloying of the metal and semiconductor.

Figure 3:
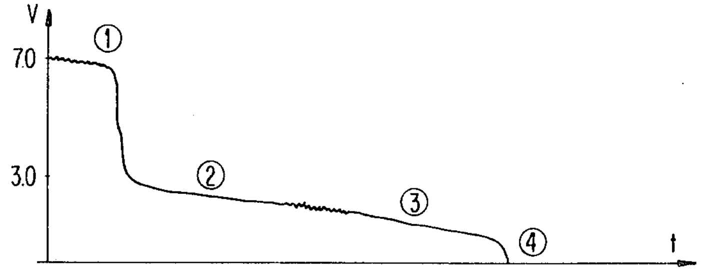
FIG. 3 is a graph of voltage versus time for the voltage across a reverse biased diode during fusing.

Voltage graphs of the voltage across diodes, while fusing, appear substantially as the "fusing" voltage versus time graph shown in FIG. 3. Observations suggest the following. Area one of the graph represents localized junction breakdown, which is about 7 volts for the diodes used. At area two of the graph, heating of the semiconductor bulk material goes intrinsic and at area three metal-semiconductor alloying occurs. At area four, the metal semiconductor alloy connects causing a short between the metal lands. It has also been observed that the time for fusing decreases with the distance between the metal lands, and thus, in a preferred embodiment of the cell of the present invention, the land separation is as small as manufacturing tolerances allow.

Figure 4:
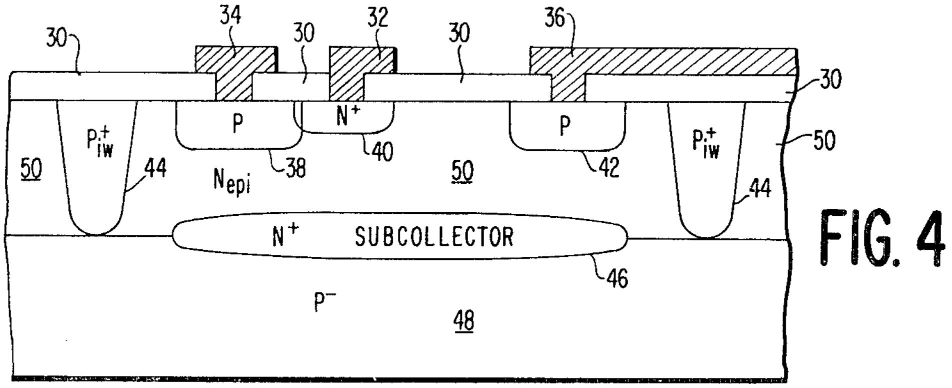
FIG. 4 is a cross-sectional side view of specific example of a semiconductor cell capable of being fused.
Figure 5:
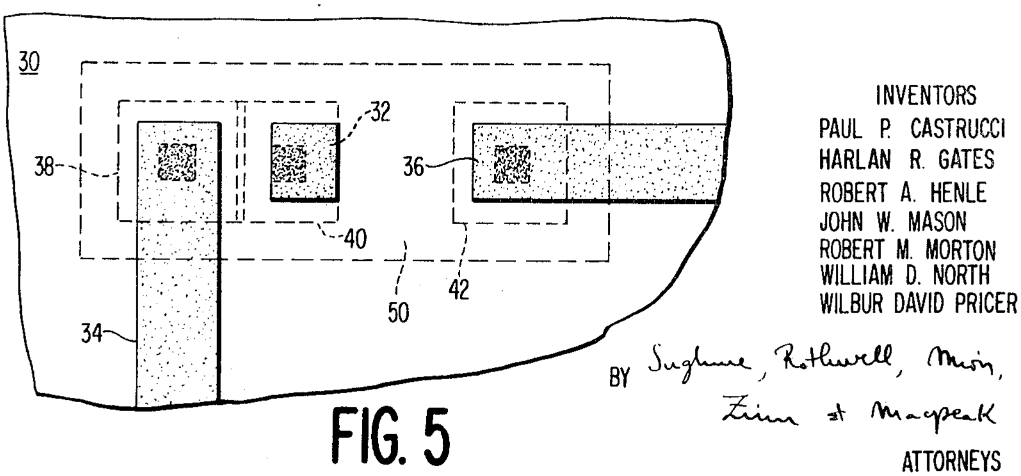
FIG. 5 is a top view of the cell of FIG. 4.

A preferred embodiment of the alterable cell of the present invention is illustrated in FIGS. 4 and 5, which show the side and top views respectively of the same cell.

A P− semiconductor substrate 48 has an N+ "subcollector" region 46 therein which is underneath the two diodes of the cell. The subcollector is not required but, as is well known in the art, improves the device characteristics. An N epitaxial layer 50 is formed on the P− substrate 48, and the cell is electrically isolated (internally) from other elements on the same chip by a surrounding P+ isolation region 44. Two P regions, 38 and 42, formed by diffusion into the epitaxial layer 50, form back-to-back diodes by virtue of the PN boundaries created. For the purpose of decreasing the reverse breakdown voltage of one of the diodes an N+ region 40 is formed in the epitaxial layer 50 between the two P regions 38 and 42, and touches P region 38. The touching of the N+ region 40 to the P region 38 results in a reverse breakdown voltage at the PN+ barrier which is substantially less than the reverse breakdown voltage of the PN barrier formed by either of the P regions 38, 42 and the epitaxial region 50.

The semiconductor material is preferably silicon but others may also be suitable, as will be recognized by those of ordinary skill in the art. An insulating coating 30, such as silicon dioxide covers the surface of the chip and holes are made therethrough for the purpose of allowing metal conductors to contact the semiconductor material at appropriate positions. Metal 34, forming a bit line, contacts the P region 38; metal 36, forming a word line, contacts the P region 42; metal 32 contacts the N-type conductivity region, specifically the N+ region 40. The metal is preferably aluminum but may be other metals such as aluminum-copper or gold. In selecting suitable semiconductor material and metal, other than the standard criteria used in the selection process for making integrated circuits, an additional criteria here appears to be that the eutectic temperature of the metal-semiconductor be below the melting point of either the metal or the semiconductor.

The metal 32 is defined herein as a free metal, free metal contact, or free metal land. The designation "free" connoting that the metal applied to the N+ region is not connected to other circuit elements in the chip. For example the bit line 34 is to be connected to a group of diodes and to sense amplifiers and other circuits; the word line 36 is to be connected to a group of diodes and to a word drive and possibly other circuits. The fusing current/voltage is applied to the bit and word lines. The free metal 32 serves the purpose of providing a terminal for the aluminum-silicon alloy connection formed during the fusing process, and also, presumedly, as a supplier of aluminum atoms for formation of the aluminum silicon alloy.

In FIG. 5 the P and N+ and N epitaxial regions are delineated by dashed lines. The solid squares on the metal 32, 34 and 36 designate the contact holes through the oxide coating 30 directly under the metal.

In a specific example, the distance between the contact hole metallization for the N+ region 40 and P region 38 is 0.25 mils and the dopant concentration of the conductivity regions are substantially as follows:

P diffusion—$10^{19}$ Boron atoms/cc.
N+ diffusion—$10^{21}$ Phosphorus atoms/cc.
P+ diffusion—$10^{21}$ Boron atoms/cc.
N epitaxial—$10^{16}$ Arsenic atoms/cc.
N+ subcollector—$10^{21}$ Arsenic atoms/cc.

A device having the characteristics described was found to fuse (in this case go from 8 volts to less than 1 volt) in about 1 to 10 milliseconds under an applied current of 100 milliamperes, the current being applied by a constant current generator. An aluminum silicon alloy connector connects metal lands 34 and 32 beneath the oxide coating 30 and shorts the PN+ junction. It should be noted that the diode is not destroyed in the sense that a PN or PN+ junction no longer exists. However, since it is shorted it no longer serves as a barrier for current flow between the word and bit lines.

Figure 6:
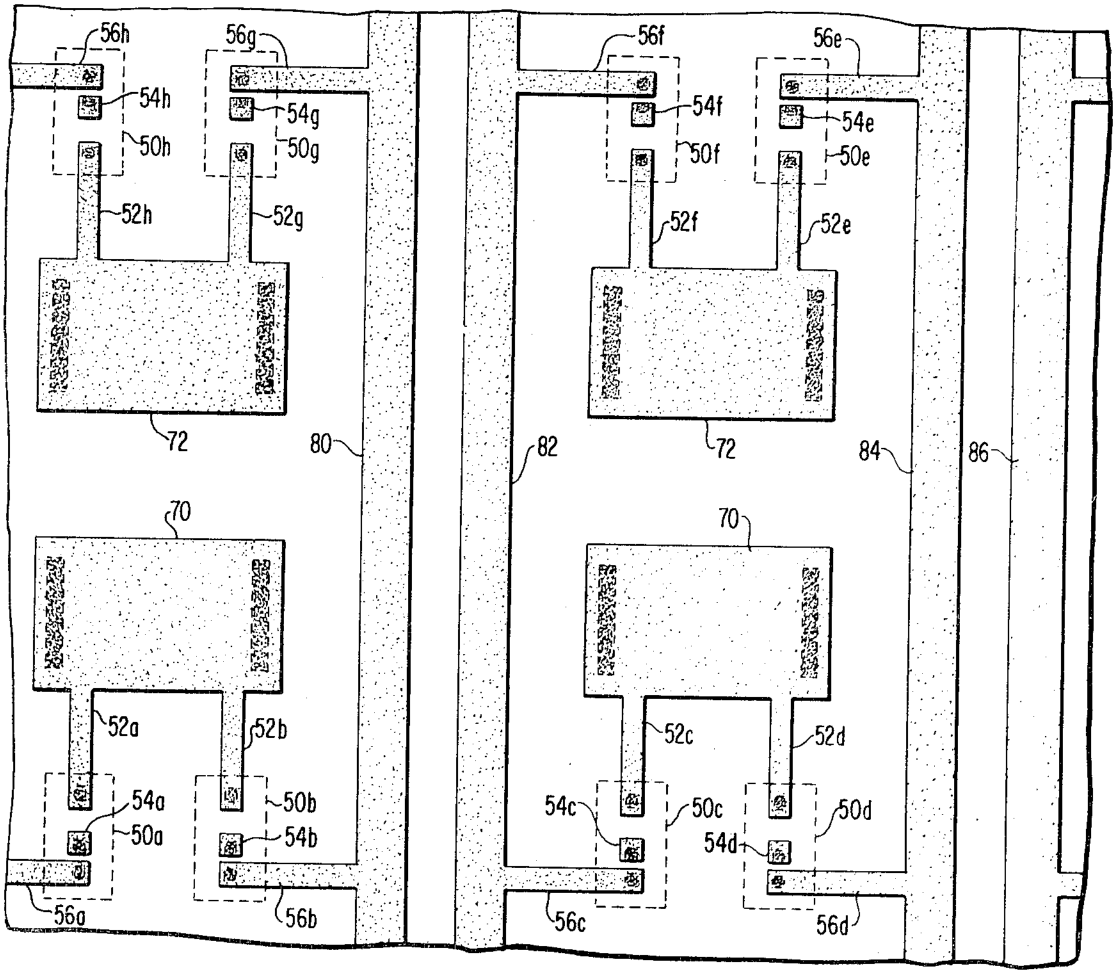
FIG. 6 is a top view of a portion of a monolithic circuit device incorporating multiple fuseable cells and interconnections therebetween.

An example of a portion of an integrated monolithic matrix comprising multiple cells and their respective interconnections is illustrated in FIG. 6. The top view of the illustrated portion of the monolithic matrix shows only eight cells 50_a_–50 but it will be apparent that many more cells can be accommodated by the same layout scheme. The cells 50_a_–50_g_ are identical to the cell shown in FIGS. 4 and 5. The subscripts *a–g* are used to represent the identical features of the cells 50*a* through 50*g* respectively, and thus the description will omit the subscript and describe the cells collectively by the reference numerals alone. The cell 50 comprises metallization connections 52*a*, 54*a* and 56*a* which are connected respectively to the P, N+ and P regions. The "reverse" diode or fuseable diode is formed by the semiconductor regions to which metallization 54*a* and 56*a* are connected. The drawing also shows word line or horizontal line metallization 70 and 72 and bit line or vertical line metallization 80, 82, 84, 86. Each bit line metallization is connected to a column of cells and each word line metallization is connected to a row of cells. For example bit line 80 is connected to cells 50*b* and 50*g* (and also to other cells in the same column—not shown) by metallization 56*b* and 56*g*. Word line 70, for example, is connected to cells 50*a*, 50*b*, 50*c* and 52*d*, respectively. An underpass connection interconnects the word line metallization on opposite sides of the bit lines. This allows a single layer of metallization for bit and word lines despite the crossover characteristic of the layout. Underpass interconnections are known in the art and usually comprise a region of semiconductor material doped to be relatively highly conductive. Metallization contacts the doped region at opposite ends thereof.

Figure 7:
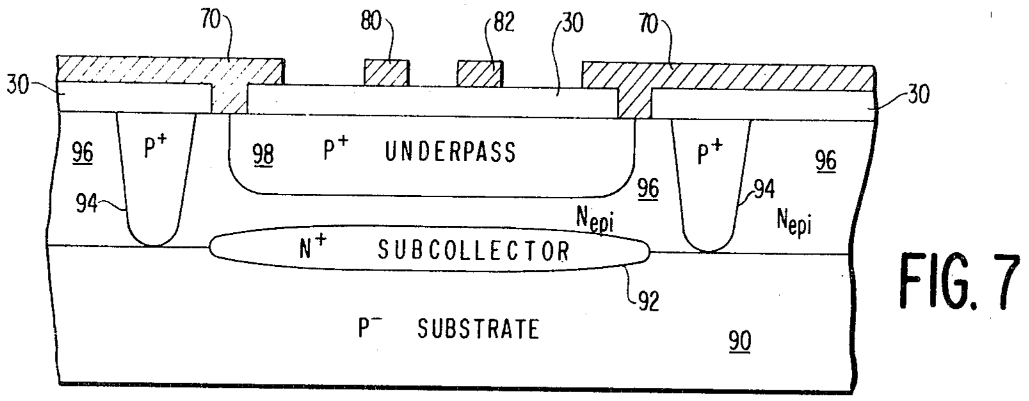
FIG. 7 is a cross-sectional side view of a portion of FIG. 6 which includes an underpass connection.

A cross-sectional side view of a portion of the monolithic circuit of FIG. 6 which shows the underpass connection is shown in FIG. 7. A P+ region 98 is formed by diffusing dopant materials down to the N+ subcollector 92. A P+ isolation diffusion isolates the region of the underpass connection from the remainder of the integrated structure. All diffusions are made into the N epitaxial layer 96, except for the subcollector diffusion which is made into the P– substrate 90. The subcollector blocks the underpass connection 98 from extending down to the P– substrate and thereby allows formation of the P+ underpass region 98 and the P+ isolation diffusion to be made by the same step in the manufacturing process.

Word line metallization 70 extends through the contact holes and makes contact with the underpass region 98. Thus a continuous conductive word line extends from the right hand metallization section 70, through the region 98 to the left-hand metallization 70. Except for the contact holes, the surface of the region 98 as well as the surface of the entire integrated structure is covered with an oxide insulator 30. The bit lines 80 and 82 cross the word line 70 over the underpass region and are electrically isolated therefrom by the oxide 30.

The sequence of forming the matrix shown in FIG. 6, which comprises devices shown in FIGS. 4, 5 and 7, is as follows: start with a P– semiconductor chip; diffuse N+ subcollector regions for cell areas and underpass areas; grow an N epitaxial layer on the substrate; diffuse P+ isolation and underpass regions; diffuse P regions of the cell; diffuse N+ regions of cells; oxidize surface and make contact holes in oxide; form metal pattern on surface. Each of the above steps may be accomplished in accordance with well-known fabrication techniques.

Figure 8:
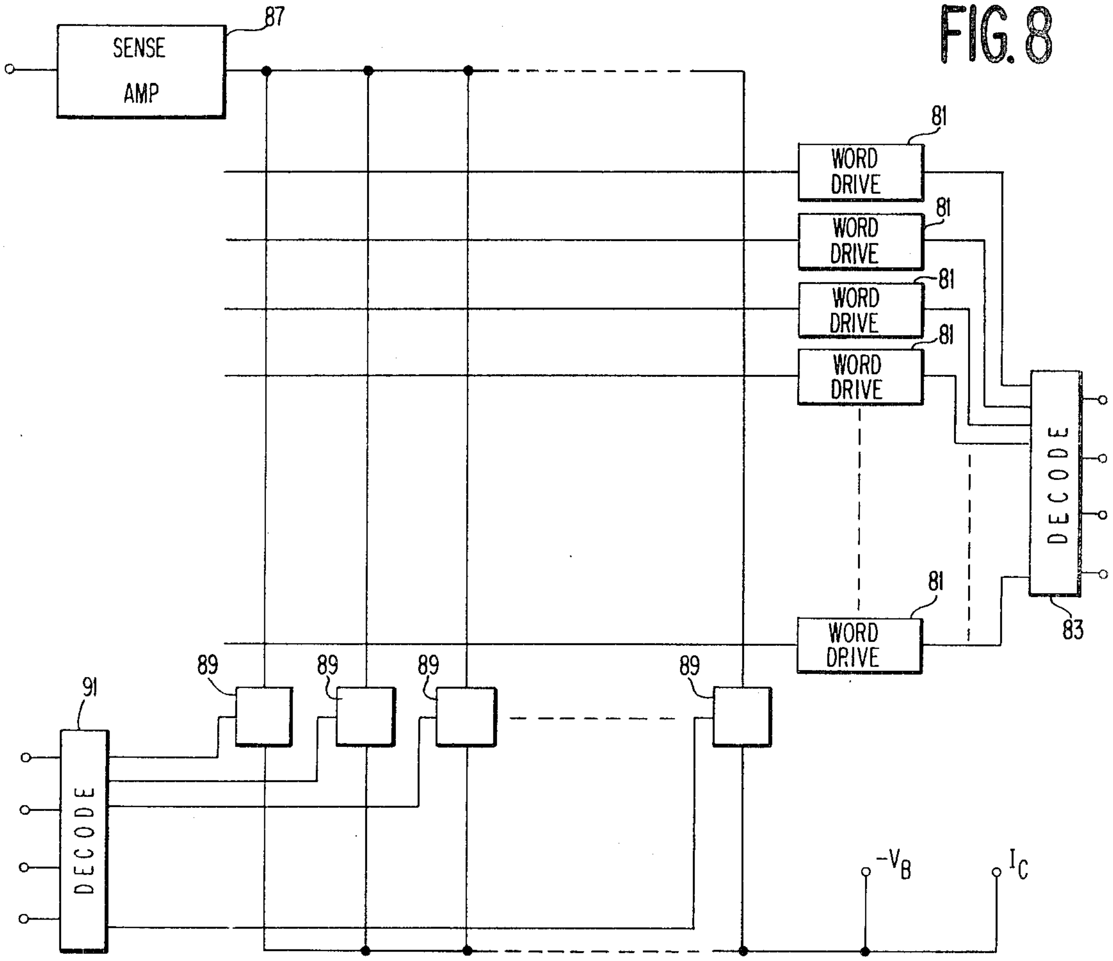
FIG. 8 is a partial schematic and partial block diagram illustrating the use of fuseable cells as part of a write once read only store.

As will be appreciated by any one of ordinary skill in the art, the monolithic or integrated structure will also include driving, sensing and decoding circuits on the same chip. As these types of circuits are well known in the art and further since the specific form of these circuits is not a part of the present invention they will not be illustrated in detail herein. A partial schematic, partial block diagram of the circuit arrangement of the elements formed on a chip is shown in FIG. 8 for a 16 by 16 line matrix.

The matrix comprises 16 word or horizontal lines and 16 bit or vertical lines. A cell connection exists at each word line-bit line cross-point, but they are not illustrated in order not to clutter the drawing. Each word line is connected to a word drive circuit 81 which operates when gated on to connect the respective word line to a ground or relatively positive potential. One word line is selected by a four-bit binary code which is applied from an external source to the decode device 83. The latter device gates on the word driver connected to the addressed line.

Each of the 16-bit lines in the group is connected to a sense amplifier circuit 87 at one end thereof, and to one of the respective gates 89 at the other end thereof. A particular bit line is selected by an externally applied four-bit binary address which is applied to a decode circuit 91. The output of decode circuit 91 gates on the gate 89 which is connected to the addressed bit line thereby connecting the addressed bit line to the terminals $-V_B$ and $I_C$.

In order to fuse the reverse diode at the intersection of bit line *x* and word line *y*, the addresses *x* and *y* are applied respectively to the decode circuits 90 and 83 and a constant current generator which generates 100 ma. is connected to terminal $I_C$. As illustrated, the positive current flow is in the direction from word line to bit line. The reverse diode fuses thereby providing a nonblocking connection between word line *y* and bit line *x* in one direction.

For read out, a bit and word line are addressed and a relatively low level negative voltage is applied to terminal $-V_B$. The signal sensed by the sense amplifier 87 indicates whether the addressed cell contains a fuse or no-fuse, which can be interpreted as a binary one or zero.

The particular arrangement shown in FIG. 8 is not critical. Other arrangements will readily suggest themselves to those of ordinary skill in the art and it is deemed unnecessary to show further arrangements since the application of the invention to ROS usage is sufficiently clear.

Figure 9:
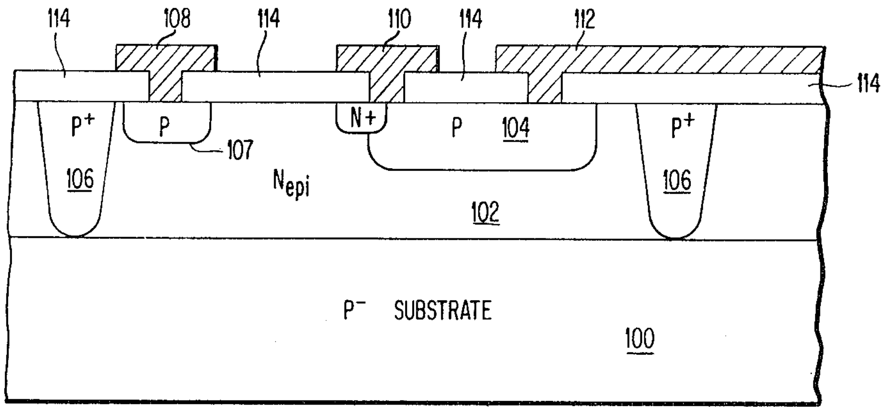
FIG. 9 is a cross-sectional side view of a fuseable cell having a fuseable resistor.

It has further been discovered that the fuseable device in the cell need not be a diode, but may be just a region of relatively high resistivity semiconductor material to which the bit and free metal contacts are made. One example of a cell with a fuseable "resistor" is shown in FIG. 9.

As shown, an N epitaxial layer 102 is formed on a P-substrate and the cell device is isolated from the rest of the integrated or monolithic structure by a P+isolation diffused region 106. A P region 104, formed by diffusing Boron, for example, into the epitaxial region 102, forms the resistor. A metal land 108 forms a connection to a bit line and a metal land 112 forms a connection to a word line. The metal 108 is connected via a contact hole in the oxide coating 114 to the P region 107, and for the embodiment shown must be biased by a positive voltage. The metal 112 is connected via a contact hole in the oxide coating 114 to the P region 104. The free metal land 110 contacts the junction of an N+ region 105 and the P region 104 thereby shorting that junction. The N+ region 105 may be formed by diffusion of impurities into the semiconductor material. The purpose of the N+ region is to make a good contact between metal land 110 and the epitaxial region 102. For fusing, a sufficient current is applied, in the forward direction of the cell's diode, to heat the area around the metal contacts 110 and 112 causing a metal-semiconductor alloy to form and interconnect contacts 110 and 112. The fused cell will have a much lower overall resistance than a nonfused cell and these two conditions can easily be detected rendering the cell useful in a matrix application.

We claim:

1. A permanently alterable semiconductor cell comprising a body of semiconductor material having a PN junction therein extending to a surface of said semiconductor body, a first metal land forming one terminal of said cell, electrically and physically contacting said body at said surface on one side of said junction, a second metal land forming the second terminal of said cell, electrically and physically contacting said body at said surface on the other side of said junction, a free metal land electrically and physically contacting said body at said surface on said other side of said junction and positioned between said first and second metal lands;

two semiconductor regions of a first type conductivity extending to said surface and physically separated by a semiconductor region of a second type conductivity, said first and second metal lands respectively contacting said two semiconductor regions of a first type conductivity, said free metal land contacting said region of said second type conductivity;

said region of a second type conductivity comprises a portion having a higher concentration of dopant atoms than the remainder of said region of a second type, said portion extending to said surface and touching said region of said first type conductivity which is contacted by said second metal land, said free metal land contacting said portion; and a metal semiconductor alloy electrically interconnecting said free metal and second metal lands, said alloy interconnector being substantially at the surface of said semiconductor.

2. A permanently alterable semiconductor cell as claimed in claim 1 wherein said regions of a first type conductivity are P type conductivity regions and said region of said second type conductivity is an N type conductivity region.

3. A permanently alterable semiconductor cell as claimed in claim 1 wherein said semiconductor body is silicon and said metal lands are aluminum.

4. A monolithic programmable ROS semiconductor memory comprising a semiconductor chip, a plurality of electrically conductive word paths on said chip a plurality of electrically conductive bit paths on said chip a plurality of electrically permanently alterable cells each having a current voltage characteristic prior to permanent alteration substantially different from the current voltage characteristic subsequent to alteration, each cell being connected between a word line and a bit line forming a matrix of permanently alterable cells, each of said cells comprising a pair of back-to-back diodes, the first diode of said pair having a different reverse breakdown voltage than the second diode of said pair, means on said chip responsive to address code data for permanently altering selected cells, and means on said chip responsive to address code data for sensing the altered and nonaltered condition of addressed cells.

5. A monolithic programmable ROS semiconductor memory comprising a semiconductor chip, a plurality of electrically conductive word paths on said chip, a plurality of electrically conductive bit paths on said chip, a plurality of electrically permanently alterable cells each having a current voltage characteristic prior to permanent alteration substantially different from the current voltage characteristic subsequent to alteration, each cell being connected between a word line and a bit line forming a matrix of permanently alterable cells, means on said chip responsive to address code data for permanently altering selected cells, and means on said chip responsive to address code data for sensing the altered and nonaltered condition of address cells, and wherein each of said cells comprises a section of said semiconductor chip including a surface area portion, conductivity regions in said section forming a PN junction extending to said surface area, a first metal land electrically and physically contacting said surface on one side of said junction, a second metal land electrically and physically contacting said surface on the other side of said junction, said cell being connected between one word and one bit lines by electrical connectors extending from said lines to said first and second metal lands, and a free metal land electrically and physically contacting said surface on said other side of said junction and positioned between said first and second metal lands.

6. A memory as claimed in claim 5 wherein said cell further comprises, two regions of a first type conductivity in said section extending to said surface and physically separated by a semiconductor region in said section of a second type conductivity, said first and second metal lands respectively contacting said two semiconductor regions of a first type conductivity, said region of second type conductivity including a portion of a higher concentration of dopant atoms than the remainder of said region of a second type conductivity, said portion adjacent one of said regions of a first type conductivity and extending to said surface, and said free metal land contacting said portion of higher concentration.

7. A memory as claimed in claim 5 wherein a group of said cells further comprise a metal-semiconductor alloy connecting said free metal land to said second metal land and positioned substantially at the surface of said semiconductor material.

8. A memory as claimed in claim 7 wherein said semiconductor is silicon and said metal lands are aluminum.

9. A monolithic circuit structure comprising, a semiconductor body having a plurality of two terminal cells formed therein, a first group of conductive paths, a second group of conductive paths, each said cell being connected via said two terminals between one of said first group of conductive paths and one of said second group of conductive paths, forming a matrix of cells, each said cell comprising a section of said semiconductor chip including a surface area portion, conductivity regions in said section forming a PN junction extending to said surface area, a first metal land electrically and physically contacting said surface on one side of said junction, a second metal land electrically and physically contacting said surface on the other side of said junction, said cell being connected between one path of said first group and one path of said second group by electrical connectors extending from said path to said first and second metal lands, and a free metal land electrically and physically contacting said surface on said other side of said junction and positioned between said first and second metal lands.

10. A memory as claimed in claim 9 wherein said cell further comprises, two regions of a first type conductivity in said section extending to said surface and physically separated by a semiconductor region in said section of a second type conductivity, said first and second metal lands respectively contacting said two semiconductor regions of a first type conductivity, said region of second type conductivity including a portion of a higher concentration of dopant atoms than the remainder of said region of a second type conductivity, said portion adjacent one of said regions of a first type conductivity and extending to said surface, and said free metal land contacting said portion of higher concentration.

11. A memory as claimed in claim 10 wherein a group of said cells further comprise a metal-semiconductor alloy connecting said free metal land to said second metal land and positioned substantially at the surface of said semiconductor material.

12. A memory as claimed in claim 11 wherein said semiconductor is silicon and said metal lands are aluminum.

* * * * *